(12) United States Patent
Wakeford et al.

(10) Patent No.: US 10,293,248 B2
(45) Date of Patent: *May 21, 2019

(54) SYSTEM AND METHOD FOR FACILITATING USER DEFINED VIRTUAL SPACE

(71) Applicant: Aftershock Services, Inc., San Ramon, CA (US)

(72) Inventors: Kent Wakeford, Hillsborough, CA (US); Clifford J. Harrington, San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 637 days.

This patent is subject to a terminal disclaimer.

(21) Appl. No.: 14/949,765

(22) Filed: Nov. 23, 2015

(65) Prior Publication Data

US 2016/0074750 A1 Mar. 17, 2016

Related U.S. Application Data

(63) Continuation of application No. 13/781,651, filed on Feb. 28, 2013, now Pat. No. 9,195,376.

(51) Int. Cl.
*G06F 3/0484* (2013.01)
*G06F 3/0481* (2013.01)
(Continued)

(52) U.S. Cl.
CPC ............ *A63F 13/216* (2014.09); *A63F 13/65* (2014.09); *A63F 13/79* (2014.09); *A63F 13/80* (2014.09);
(Continued)

(58) Field of Classification Search
CPC ...... G06F 3/011; G06F 3/04815; G06F 3/048; G06F 3/0484; G06F 17/30286;
(Continued)

(56) References Cited

U.S. PATENT DOCUMENTS 8,287,383 B1  10/2012  Etter
8,649,803 B1  2/2014  Hamill
(Continued)

OTHER PUBLICATIONS

Benford, Steve et al., University of Nottingham and Tandavanitj, Nick et al. Blast Theory, "Can You See Me Now?", ACM Transactions on Computer-Human Interaction, vol. 13, No. 1, Mar. 2006, pp. 100-133, 34 pages.

Duryee, Tricia (http://allthingsd.com/author/tricia/), Zynga's New Mobile Game Will Incorporate Location-Based Check-Ins, Oct. 11, 2011 at 5:10 PM PT, http://allthingsd.com/20111011/zyngas-new-mobile-game-will-incorporate-location-based-c . . . , printed Feb. 4, 2013, 4 pages.

*Primary Examiner* — Ting Z Lee

(74) *Attorney, Agent, or Firm* — Knobbe, Martens, Olson & Bear, LLP

(57) ABSTRACT

A system and method for facilitating a user defined virtual space is disclosed. One or more virtual space locations and/or activities may be correlated with user specified geolocations. In some implementations, the user specified geolocations may be verified against one or more spatial requirements prior to recording the user selected space-geolocation correlations. A user request to initiate an action or activity in the virtual space may be received. Prior to executing the requested action or activity in the virtual space, the user current geolocation may be verified against that specified in a space-geolocation correlation corresponding to a virtual space location or activity indicated in the user request.

18 Claims, 3 Drawing Sheets

(51) Int. Cl.
*G06F 3/01* (2006.01)
*G06F 3/048* (2013.01)
*G06F 17/30* (2006.01)
*A63F 13/21* (2014.01)
*A63F 13/65* (2014.01)
*A63F 13/79* (2014.01)
*A63F 13/80* (2014.01)
*A63F 13/87* (2014.01)
*G06F 16/20* (2019.01)
*A63F 13/216* (2014.01)

(52) U.S. Cl.
CPC .............. *A63F 13/87* (2014.09); *G06F 3/011* (2013.01); *G06F 3/0484* (2013.01); *G06F 3/048* (2013.01); *G06F 3/04815* (2013.01); *G06F 16/20* (2019.01)

(58) Field of Classification Search
CPC .... G06F 1/30286; G06F 16/20; A63F 13/216; A63F 13/80; A63F 13/87; A63F 13/65; A63F 13/79
See application file for complete search history.

(56) References Cited

U.S. PATENT DOCUMENTS

| | | | |
|---|---|---|---|
| 9,195,376 B1 | 11/2015 | Wakeford | |
| 9,262,856 B1* | 2/2016 | Crocker | G06T 13/40 |
| 9,483,854 B1 | 11/2016 | Wakeford et al. | |
| 2002/0183961 A1 | 12/2002 | French | |
| 2009/0017913 A1 | 1/2009 | Bell | |
| 2010/0302143 A1* | 12/2010 | Spivack | G06F 21/6209 345/157 |
| 2011/0250965 A1 | 10/2011 | Kulas | |
| 2011/0319148 A1 | 12/2011 | Kinnebrew | |
| 2012/0040745 A1 | 2/2012 | Auterio | |
| 2012/0244945 A1 | 9/2012 | Kolo | |
| 2012/0283855 A1 | 11/2012 | Hoffman | |
| 2013/0023291 A1* | 1/2013 | Pilskalns | G06F 17/30241 455/456.3 |
| 2013/0040714 A1 | 2/2013 | Rosing | |
| 2013/0054690 A1* | 2/2013 | Wei | G06Q 10/107 709/204 |
| 2013/0344958 A1 | 12/2013 | Mullen | |

* cited by examiner

SYSTEM AND METHOD FOR FACILITATING USER DEFINED VIRTUAL SPACE

FIELD OF THE DISCLOSURE

This disclosure relates to facilitating a user defined virtual space based on geolocations.

BACKGROUND

Systems that reward users with virtual items for completion of activities in real world locations are known. For example, some systems unlock a virtual item in user inventory upon user's completion of real world location based activity such as checking into a restaurant or coffee shop. In another example, some systems generate offers of rare virtual items to incentivize users to go to real world locations or introduce friends to real world locations.

Systems that use real world locations to establish game rules are also known. Some systems of those systems use real world locations as positions on a game board/map. For example, users are required to capture real world locations specified on the game board/map by sending text messages from the real world locations to a game server.

SUMMARY

One aspect of the disclosure relates to facilitate users of virtual space to correlate real world locations with virtual space locations and/or virtual space activities. With such facilitations, individual users may be enabled to customize his or her experiences with virtual space by selecting real world locations at which desired actions and/or activities in the virtual space may be initiated and executed in the virtual space. This may provide a real world layer to the virtual space such that user experience with the virtual space may be enhanced. Simultaneously or alternatively, this may provide users a customized virtual space navigation system anchored to real world locations. Such a customized virtual space may enhance user enjoyment in the virtual space as the users move around in the real world in order to participate in the virtual space.

In some implementations, a system configured to facilitate user defined virtual space may include one or more processors configured to execute one or more computer program modules. The computer program modules may include one or more of a space module, a user module, a space-geolocation correlation module, a space-geolocation request module, a user geolocation module, and/or other modules.

The user module may be configured to manage user information associated with individual users. The user information may include user selected space-geolocation correlations between geolocations and virtual space locations and/or virtual space activities. The user information may include first user information associated with a first user, which may comprise a first space-geolocation correlation between a first virtual space location and/or a first activity, and a first geolocation.

The space-geolocation correlation module is configured to enable users to correlate geolocations with virtual space locations and/or virtual space activities. As enabled by the space-geolocation correlation module, a user may specify correlations between actions and/or activities in the virtual space with geolocations in the real world. In some implementations, the space-geolocation correlation module may be further configured such that correlations are recorded when the space-geolocation correlation module determines the user specified geolocations satisfy one or more spatial requirements, which may be used to set up one or more geofences. A geofence may include perimeters that define a real-world geographic area. The geofences may be defined by specifying, for example, a minimum distance between geolocations to be correlated with the virtual space locations and/or activities, a geometry pattern among geolocations to be correlated with the virtual space locations (e.g., the geolocations should form a triangle, a square, a circle, etc.), relative positions between or among geolocations based on the virtual space locations to be correlated with the geolocations (e.g., if virtual space location A lies south of virtual space location B in the virtual space, the geolocation correlated with virtual space location A must also lies south of the geolocation correlated with virtual space location B in the real world) and/or any other spatial requirements.

The space-geolocation request module may be configured to generate requests requesting users to correlate geolocations with virtual space locations and/or activities. In some implementations, the requests may specify one or more spatial requirements, e.g., such as those described above to notify the users that the specified geolocations to be correlated with the virtual space locations must satisfy these spatial requirements.

The user geolocation module may be configured to obtain geolocation information indicating current geolocations of the users. In some implementations, such location information regarding the users may be obtained from client devices associated with the users. Geolocation information obtained from a client device may specify the geolocation of the client device. The geolocation information may be transmitted wirelessly from the client devices. The user geolocation module may be configured to obtain the geolocation information in real-time, near-real time, and/or after a delay. The geolocation information may include one or more of Internet protocol address, MAC address, RFID information, Wi-Fi connection location, Global Positioning System coordinates, radio frequency triangulation information, and/or other information.

The space module may be configured to execute an instance of a virtual space. The space module may implement the instance of the virtual space to facilitate participation by users in the virtual space. The space module may be configured to receive user requests to initiate actions at locations within the virtual space. A user request to initiate an action in the virtual space may specify an action type associated with the requested action. The action type may be used to obtain a function, method, routine, formula, software module or modules, and/or any other means that may be used to execute the requested action. Examples of an action type may include, but not limited to, defending, attacking, mining, logging, farming, managing, surveying, training, researching, constructing, recruiting and/or any other action types appropriate for the virtual space. The user requests to initiate an action may also specify one or more virtual space objects and/or characters to be acted on, for example, specific buildings (e.g., farm, bank, barrack, mill, lumber yard, etc.), resources (e.g., iron, gold, oil, coal, etc.), troop, knights and so on.

The space module may be configured to execute user requested actions at virtual space locations in an instance of the virtual space. The virtual space locations may include, but not limited to, areas designated as a city, realm, kingdom, state, nation, culture or the like, tiles for improvements (e.g., resource tiles that may be mined, food tiles that may be farmed, land tile that may be used to construct buildings, etc.), topology (e.g., road, hill, ocean, desert, lake, swamp, etc.) and/or any other locations appropriate for the virtual space. Prior to executing the user requested action in a virtual space location, the space module may be configured to verify the current geolocation of the requesting user against the geolocation specified in the correlation relating to the virtual space location where the requested action is to be executed. This may involve obtaining the correlation from the requesting user account based on the virtual space location where the user requested action is to be executed, obtaining the current geolocation of the requesting user, and determine whether the current geolocation of the requesting user matches the geolocation specified in the obtained correlation. In the event where a match is found, the requested user action may be executed in the virtual space location. In the event where a match is not found, the requested user action may not be executed in the virtual space location.

The space module may be configured to receive user requests to participate in activities in the virtual space and execute those activities. The user requested activities may include, but not limited to, initiating virtual space transactions (e.g., buying or selling virtual items, ordering services provided by the virtual space, and/or any other virtual space transactions), partaking in a mission, quest, campaign, expedition, training, tutorial, research and/or so on in the virtual space, consulting a virtual space expert (e.g., asking virtual consultants questions about performing diplomacy in the virtual space), messaging other users (e.g., texting, text chatting, voice chatting, etc.), convening (e.g., conducting an alliance meeting, voting in an alliance meeting, etc.) and/or any other virtual space activities.

In some implementations, prior to executing the user requested activities, the space module may be configured to verify the current geolocation of the requesting user against the geolocation specified in the correlation relating to the requested activities. This may involve obtaining the correlation from the requesting user account based on the user requested activities, obtaining the current geolocation of the requesting user, and determine whether the current geolocation of the request user matches the geolocation specified in the obtained correlation. In the event where a match is found, the requested user activities may be executed. In the event where a match is not found, the requested user activities may not be executed.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
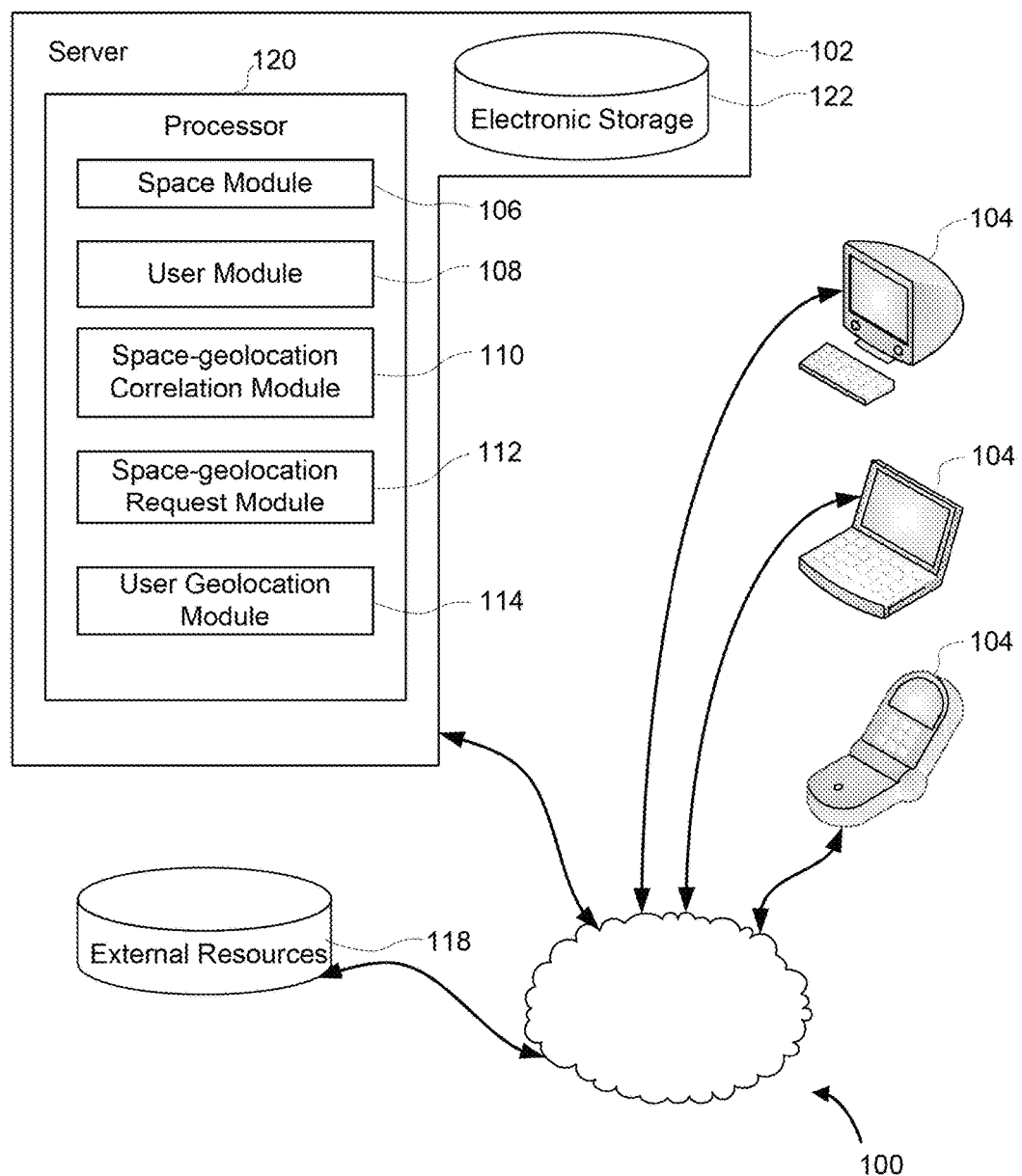
FIG. 1 illustrates an exemplary system configured to facilitate a user defined virtual space.

FIG. 1 illustrates a system 100 configured to facilitate user defined virtual space based on geolocations. The virtual space may be customized by a user by selecting a space-geolocation correlation. The space-geolocation correlation may specify a correlation between a virtual space location and/or activity, and a geolocation in the real world such that an action to be executed at that virtual space location or the activity to be executed in the virtual space must be requested by the user at the correlated geolocations. Spatial requirements may be specified for the user selected geolocations in the space-geolocation correlations such that the user selected geolocations must conform to the spatial requirements that may reflect geographic relationship between or among virtual space locations. In some implementations, system 100 may include a server 102. The server 102 may be configured to communicate with one or more client computing platforms 104 according to a client/server architecture. The users may access system 100 and/or the virtual space via client computing platforms 104.

Server 102 may be configured to execute one or more computer program modules. The one or more computer program modules may include one or more of a space module 106, a user module 108, a space-geolocation correlation module 110, a space-geolocation request module 112, a user geolocation module 114, and/or other modules.

The user module 108 may be configured to manage one or more user profiles and/or user information associated with users of the system 100. The one or more user profiles and/or user information may include information stored by server 102, one or more of the client computing platforms 104, and/or other storage locations. The user profile and/or user information may include, among other things, user selected correlations between geolocations and virtual space locations and/or virtual space activities. As used herein, such a correlation will be referenced as a space-geolocation correlation. For example, a user may specify a space-geolocation correlation such that a virtual space location, e.g., a city controlled by the user in the virtual space, may correspond to a geolocation that identifies real world location, e.g., a living room in the user's residence in the real world. In another example, the user may specify a space-geolocation correlation between a virtual space activity, e.g., initiating virtual space transaction such as purchasing a virtual item, and a geolocation that identifies a real world location, e.g., a grocery store. Such user selected space-geolocation correlations may be recorded in the user profile and/or user information such that they may be accessed by the user module 108 and/or other modules of system 100.

The space-geolocation correlation module 110 may be configured to enable users to correlate geolocations with virtual space locations and/or virtual space activities. In some implementations, a user interface (e.g., graphical, command line, voice and/or any other interfaces) may be provided by the space-geolocation correlation module 110 such that a user may correlate a geolocation with a virtual space location and/or virtual space activity through the user interface. For example, the user may be located in his/her living room at one instance and specify, through the user interface, that the current geolocation of the user—i.e., the living room should be correlated with a city that the user controls in the virtual space. In some examples, the user may specify such space-geolocation correlations by walking around geolocations in the real world; at each geolocation, the user may send the space-geolocation correlation module 110 a selection command, e.g., a tap, touch, or click on the virtual space location or virtual space activity, a voice command indicating a virtual space location or virtual space activity, and/or any other appropriate selection command that selects a virtual space location or virtual space activity to instruct the space-geolocation correlation module 110 to correlate the current user geolocation with the selected virtual space location or virtual space activity. In some implementations, the space-geolocation correlation module 110 may be configured to obtain current geolocation of the user from the user-geolocation module 114.

In any case, responsive to a user selection of space-geolocation correlation between a geolocation and virtual space location and/or a virtual space activity, the space-geolocation correlation module 110 may be configured to record the specified correlations in user profile or user information. In some implementations, the space-geolocation correlation module 110 may be configured to ensure that the geolocations specified in the user selected space-geolocation correlations satisfy one or more spatial requirements. The spatial requirements may be configured with the space-geolocation correlation module 110 (e.g., as programmed rules, triggers, conditions and so on) at a configuration stage of the space-geolocation correlation module 110. In some implementations, the spatial requirements may be configured dynamically during a runtime of the system 100 by a provider, administrator, operator and/or any other entity related to the virtual space.

In some examples, the spatial requirements may include one or more requirements setting up perimeters that may define a real-world geographic area, e.g., a geofence. For example, the spatial requirements may specify that the geolocations to be correlated with specific cities in the virtual space must form a geometry pattern, e.g., a triangle, to reflect the geographical relationship among those cities in the virtual space, e.g., the cities forming a tri-state area in the virtual space. It is understood the geometry pattern specified by a requirement may include any patterns or shapes desired by the entity that sets up the requirement. In another example, the spatial requirements may specify a minimum distance between geolocations to be correlated with the virtual space locations and/or activities. For instance, the spatial requirements may specify that a geolocation corresponding to city A in the virtual space must lie at least 50 feet away from another geolocation corresponding to city B in the virtual space.

In some examples, the spatial requirements may specify that the geolocations to be correlated with the virtual space locations and/or activities must follow a direction arrangement. For instance, the spatial requirements may specify that a geolocation corresponding to city A in the virtual space must lie in the south of another geolocation corresponding to city B in the virtual space. In some examples, the spatial requirements may specify a type associated with geolocation to be correlated with the virtual space locations and/or activities. For instance, the spatial requirements may specify that a geolocation correlated with a marketplace in the virtual space must identify a real world grocery store. In those examples, the space-geolocation correlation module 110 may be configured to obtain real world location information (e.g., information indicating locations of specific restaurants, coffee shops, grocery stores, etc.) to facilitate a determination whether the current user geolocation identifies a type of real world location as required.

In any case, the space-geolocation correlation module 110 may be configured to verify whether the specified geolocation in a user selected correlation satisfies the spatial requirements prior to recording the correlation. For example, in the case where a geometry pattern of triangle is specified for the geolocations to be correlated with three virtual space locations, i.e., city A, B, C in the virtual space, the space-geolocation correlation module 110 may receive three geolocations specified by a user instructing the space-geolocation module 110 to correlate them with city A, B, C. In that case, the space-geolocation module 110 may be configured (e.g., through triggers) to verify whether the three geolocations specified by the user conform to the spatial requirements specifying the triangle. This may involve computing a geometry shape formed by the three geolocations specified by the user and comparing the computed geometry shape with that specified in the spatial requirements. Responsive to the result of the comparison, the space-geolocation correlation 110 module may be configured to determine whether to record space-geolocation correlations selected by the user. For example, in the event that the space-geolocation correlation module 110 determines that the geometry shape formed by the user specified geolocations in the user selected space-geolocation correlations does not conform to that specified in the spatial requirements, the space-geolocation correlation module 110 may not record the user selected correlations and may, in some implementations, generate a message to alert, e.g., through the user interface provided by the space-geolocation correlation module 110, the user that specified geolocations in the selected correlations do not satisfy the spatial requirements for the corresponding virtual space locations and/or activities and thus the specified correlations are not recorded.

Similarly, in the case where a minimum distance requirement is specified for geolocations to be correlated with virtual space locations and/or activities, the space-geolocation module 110 may be configured to receive user specified geolocations in user selected correlations, compute a distance between the user specified geolocations, and compare the computed distance with the minimum distance specified in the spatial requirements. For the direction arrangement specified in the spatial requirements, the space-geolocation correlation module 110 may be configured to compute the relative direction between or among the user specified geolocations and compare the computed relative direction with that specified in the spatial requirements. Based on the results of these comparisons, the space-geolocation correlation module 110 may similarly determine whether to record the user selected correlations or generate error messages notifying the user that the specified geolocations do not satisfy the spatial requirements.

For spatial requirements that specify that geolocations correlated with virtual space locations and/or activities should identify real world locations having required types, such as but not limited to, restaurant, coffee shop, grocery store, internet bar, and so on, the space-geolocation correlation module 110 may be configured to obtain real world location information. Based on the real world location information, the space-geolocation correlation module 110 may be configured to determine whether the user specified geolocations in the user selected space-geolocation correlations identify real world locations associated with the required type as specified in the spatial requirements. For example, the spatial requirements may specify that geolocations to be correlated with a marketplace in the virtual space must identify locations of grocery stores in the real world. In that example, a user may correlate geolocation A with the marketplace in the virtual space, e.g., through the user interface provided by the space-geolocation request module 110. Upon receiving such a correlation selection from this user, the space-geolocation module 110 may be configured to obtain real world location information about the specified geolocation—i.e. geolocation A, e.g., from a real world location information provider like GoogleMap™. The obtained location information may include a real world location type associated with geolocation A. This real world location type may be compared with the required geolocation type for the marketplace in the virtual space, i.e. grocery stores for a determination whether the user specified geolocation A is a grocery store as required by the spatial requirements. In the event where it is determined that the geolocation A is not a grocery store, the space-geolocation correlation module 110 may be configured not to record the user selected space-geolocation correlation and may generate an error message to alert that the user selected space-geolocation correlation was not recorded.

The space-geolocation request module 112 may be configured to generate requests requesting users of the virtual space to correlate geolocations with virtual space locations and/or activities. For example, the requests may be generated to include one or messages instructing the users to correlate virtual space locations and/or activities with geolocations in the real world. Such requests may be generated at an inception of user's experience with the virtual space. For instance, a new user of the virtual space may be prompted to correlate virtual space locations and/or activities available to the new user when the new user logs into the virtual space for the first time. In some examples, the requests may be generated and provided to the users in the virtual space dynamically during a runtime of the system 100. For example, the requests may be generated when one or more cities, kingdoms, missions, quests, campaigns and etc. are unlocked for the user.

In any case, such requests may be provided to the user, e.g., through a user interface. In some implementations, the requests may also include specifications of spatial requirements, for example those described above, to notify the user that the specified geolocations to be correlated with the virtual space locations and activities must satisfy the spatial requirements stipulated. In some implementations, such requests may be provided to the users such that the users may not ignore the requests until the required correlations have been specified by the user and satisfy the spatial requirements. In some other implementations, such requests may be provided to the user as the user move around geolocations in the virtual space. For example, as the user walks around in geolocations that are not already recorded by the space-geolocation correlation module 110 as correlated with virtual space locations and/or activities, the space-geolocation request module 112 may generate requests requesting the user to select virtual space locations and/or activities to be correlated with those geolocations.

The user geolocation module 114 may be configured to obtain geolocation information indicating current geolocations of the users. In some implementations, such location information regarding the users may be obtained from client devices associated with the users, such as the client devices 104 as illustrated. The geolocation information obtained from the client devices 104 may specify the physical locations of client devices 104. The geolocation information may include one or more of Internet protocol address, MAC address, RFID information, Wi-Fi connection location, Global Positioning System coordinates, radio frequency triangulation information, information entered to client device 104 by a user (e.g., specifying the location of client 104), and/or other information that may identify a real world location. The user geolocation module 116 may be configured to obtain geolocation information of one or more of client device 104 in a substantially ongoing manner (e.g., at a sampling rate), at discrete intervals, responsive to user selection or input, and/or according to other schemes. The user geolocation module 116 may be configured to obtain geolocation information that has been transmitted wirelessly from client devices 104. The user geolocation module 116 may be configured to obtain geolocation information that has been stored at client devices 104 for transmission to user geolocation module 116 at a later time (e.g., when docked to a computer). The user geolocation module 116 may be configured to manage storage of geolocation of client devices 104. This may facilitate determination of the geolocation of one of client device 104 at some previous time.

Space module 106 may be configured to implement an instance of the virtual space executed by the computer modules. The instance of the virtual space may provide a state of the virtual space at a particular time. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 106. Expressions of the instance executed on the clients may include space logic that effectively provides for execution of a limited version of the instance on a client that is synchronized and/or verified with state information received from space module 106. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

Within the simulated space, boundaries may be established to divide the simulated space into bounded areas. For example, a city, state, realm, domain, kingdom, culture, colony, tribe and/or any other bounded areas may be designated by boundaries in the simulated space. Walls, borders, barbwires, designations like milestones, or the like may be established along the designated boundaries to signify existence of the bounded areas in the virtual space. The bounded areas, e.g., cities, kingdoms, culture, colony, tribe or the like, may be assigned to users, for example, when the users join the virtual space. The assigned bounded area, e.g., cities may be controlled by the corresponding user such that the user may develop, manage, regulate, defend, and/or demolish the user controlled cities. For example, development of a city may be performed by constructing buildings inside the city to achieve, for example, science, defense, economy, resource, and so on. Examples of buildings in the virtual space may include, but not limited to, alchemy lab, barrack, blacksmith, castle, cottage, embassy, farm, market, mine, rally point, relief station, stable, store house, road, tavern, hospital, wall, watch tower, workshop, wind mill, zoo and/or any buildings appropriate for the virtual space. Management and/or regulation of the a city may be performed through user interface by adjusting various parameters, such as labor assigned to work in the city, number of entertainers assigned to the city, percentage of income to be taxed, funds assigned for environment protection and etc.

Bounded areas like cities may be attacked or defended. For example, attacking a city may involve sending knights and troop to siege the city by pounding the city walls, destroying watch towers, catapulting explosives into the city and/or any offensive means provided by the virtual space. The attacking may involve destroying building, looting buildings, reducing city population, and the like. Defending may involve strengthening city walls, building moats, protecting buildings (e.g., by adding protective layers), transferring wealth, hiding food, migrating city denizens, and so on.

The above description of the virtual space determined from the instance executed by space module 106 is not intended to be limiting. The virtual space may be presented in a more limited or richer manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands provided by the users through client computing platforms 104. The control inputs and/or commands provided by the user may specify an action involving controlled elements at a virtual space location. Such a user initiated action in the virtual space may change the state of the virtual space at an instance when the action is executed in the virtual space. For example, a user, e.g., through the client device 104, may send a command to the space module 106, wherein the command may initiate an action of building a farm in a virtual space location, e.g., at a location inside a city controlled by the user. The space module 106 may execute this user initiated action by updating the state information affecting the location where the user wants to build the farm. For example, the state information may be updated to associate a 2D art of a farm (e.g., an image of the farm) with the location such that when the virtual space state information is transmitted to the client device 104, a representation of a farm may be expressed on the client device 104 being at the location in the virtual space.

A user request to initiate an action in the virtual space may specify an action type associated with the requested action. Examples of an action type may include, but not limited to, defending, attacking, mining, logging, farming, managing, surveying, training, researching, constructing, recruiting and/or any other action types appropriate for the virtual space. For different action types, different function(s), method(s), routine(s), formula(s), software module(s), and/or any other means corresponding to the action types may be invoked by the space module 106 to execute the associated actions. For example, an action having a type of building, i.e. a building action may be executed by the virtual space module 106 by invoking a routine that produces an on-going effect of construction in the virtual space, e.g., associating different images representing different stages in which a structure us being built at a virtual space location.

The user requests to initiate an action in the virtual space may specify one or more virtual space objects and/or characters to be acted on, for example, specific buildings (e.g., farm, bank, barrack, mill, lumber yard, etc.), resources (e.g., iron, gold, oil, coal, etc.), troop, knights and so on. Different objects and/or characters may be associated with different action types. For example, a farm may be built, demolished and/or subjected to any other actions appropriate for the farm in a virtual space location, but may not be moved, trained, and/or healed. In contrast, a knight may be moved, trained, healed and/or subjected to any other actions appropriate for the knight in the virtual space, but may not be built and/or demolished. The set of actions a user may initiate on objects and/or characters in the virtual space may be determined and/or configured by the provider, administrator, moderator and/or any other entity related to virtual space. In some examples, this may involve creating different representational arts for an object and/or character representing different states (e.g., different images may be created to correspond to different completion stages of a farm: 25%, 50%, 75%, and 100% built). Kinematics, e.g., movements, may be defined for objects and/or characters such that their states of motion may be adapted according to the user initiated action.

The user requests to initiate an action in the virtual space may specify a virtual space location where the requested action may be executed. A virtual space location at which a user requested action may be executed may be defined as an area, in however shape and size, by the provider, administrator, moderator and/or any other entities related to the virtual space. For example, a location inside a city in the virtual space may be used to build different infrastructure in the city (e.g., farm, barrack, city hall, bank, etc.). The user may initiate an action to be executed at virtual space location, for example, through a menu provided by the system 100. For instance, the user may tap on, e.g., through a right mouse click, on the location where the user wants to build a farm to display a pull down menu, which provides a list of actions that may be executed in that location; and select from a pull down menu to build a farm at that location. Like the characters and/or objects in the virtual space, the locations in the virtual space may be associated with different action types appropriate to the locations. For example, a city may be managed, defended, attacked, regulated, and/or subjected to any other appropriate actions as defined; a topology may be mined, improved (e.g., with roads), ploughed, irrigated, attacked and/or any other subjected to any other appropriate actions as defined; and so on.

The space module 106 may be configured to verify the current geolocation of the requesting user against the geolocation specified in a user selected space-geolocation correlation corresponding to the virtual space location where the requested action is to be executed prior to executing the user requested action in the virtual space. In some implementations, this may involve obtaining a correlation recorded in the requesting user information based on the virtual space location at which the user requested action is to be executed. For example, the space module 106 may be configured to determine a virtual space location where the requested action is to be executed; a space-geolocation correlation corresponding to this virtual space location as selected by the requesting user; and a geolocation where the client device 104 should be located when executing the requested action. In that example, the space module 106 may be configured to obtain the current geolocation of the requesting user, e.g., from the user geolocation module 116, and compare the obtained current geolocation of the user with that specified in the user selected space-geolocation correlation. In the event where the current geolocation of the requesting user (e.g., the current geolocation of client device 104) is determined to match the geolocation specified in the user selected space-geolocation corresponding to the virtual space location where the requested action is to be executed, the requested user action may be executed by the space module 106 at in that virtual space location. In the event where such a match is not found, the requested user action may not be executed by the space module 106 at that virtual space location.

In some implementations, the space module 106 may be configured to receive user requests to participate in activities in the virtual space and execute those activities. The user requested activities may include, but not limited to, initiating virtual space transactions (e.g., buying or selling virtual items, ordering services provided by the virtual space, and/or any other virtual space transactions), partaking in a mission, quest, campaign, expedition, training, tutorial, research and/or so on in the virtual space, consulting a virtual space expert (e.g., asking virtual consultants questions about performing diplomacy in the virtual space), messaging other users (e.g., texting, text chatting, voice chatting, etc.), convening (e.g., conducting an alliance meeting, voting in an alliance meeting, etc.) and/or any other virtual space activities. In some examples, such user activities may not be associated with virtual space locations. For example, some user initiated transactions like upgrading a weapon in user inventory may be executed at any virtual space location.

In those implementations, prior to executing the user requested activities, the space module may be configured to verify the current geolocation of the requesting user against the geolocation specified in the user selected space-geolocation correlation corresponding to the user requested activities. This may involve obtaining the correlation from the requesting user account based on the user requested activities, obtaining the current geolocation of the requesting user, and determine whether the current geolocation of the requesting user matches the geolocation specified in the obtained space-geolocation correlation. In the event where a match is found, the requested user activities may be executed. In the event where a match is not found, the requested user activities may not be executed.

The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through space module 106).

The server 102, client computing platforms 104, and/or external resources 108 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 118 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information, hosts and/or providers of virtual environments outside of system 118, external entities participating with system 100, and/or other resources. For example, the influence information module 108 may be configured to obtain the information indicating a user's influence in the virtual space from the external resources 118. In some implementations, some or all of the functionality attributed herein to external resources 118 may be provided by resources included in system 100.

Server 102 may include electronic storage 116, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 122 may comprise non-transitory storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, 112, 114 and/or other modules. Processor 120 may be configured to execute modules 106, 108, 110, 112, 114 and/or other modules by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, 114 are illustrated in FIG. 1 as being implemented within a single processing unit, in implementations in which processor 120 includes multiple processing units, one or more of modules 106, 108, 110, 112, 114 may be implemented remotely from the other modules. The description of the functionality provided by the different modules 106, 108, 110, 112, 114 described below is for illustrative purposes, and is not intended to be limiting, as any of modules 106, 108, 110, 112, 114 may provide more or less functionality than is described. For example, one or more of modules 106, 108, 110, 112, 114 may be eliminated, and some or all of its functionality may be provided by other ones of modules 106, 108, 110, 112, 114. As another example, processor 120 may be configured to execute one or more additional modules that may perform some or all of the functionality attributed below to one of modules 106, 108, 110, 112, 114.

Figure 2:
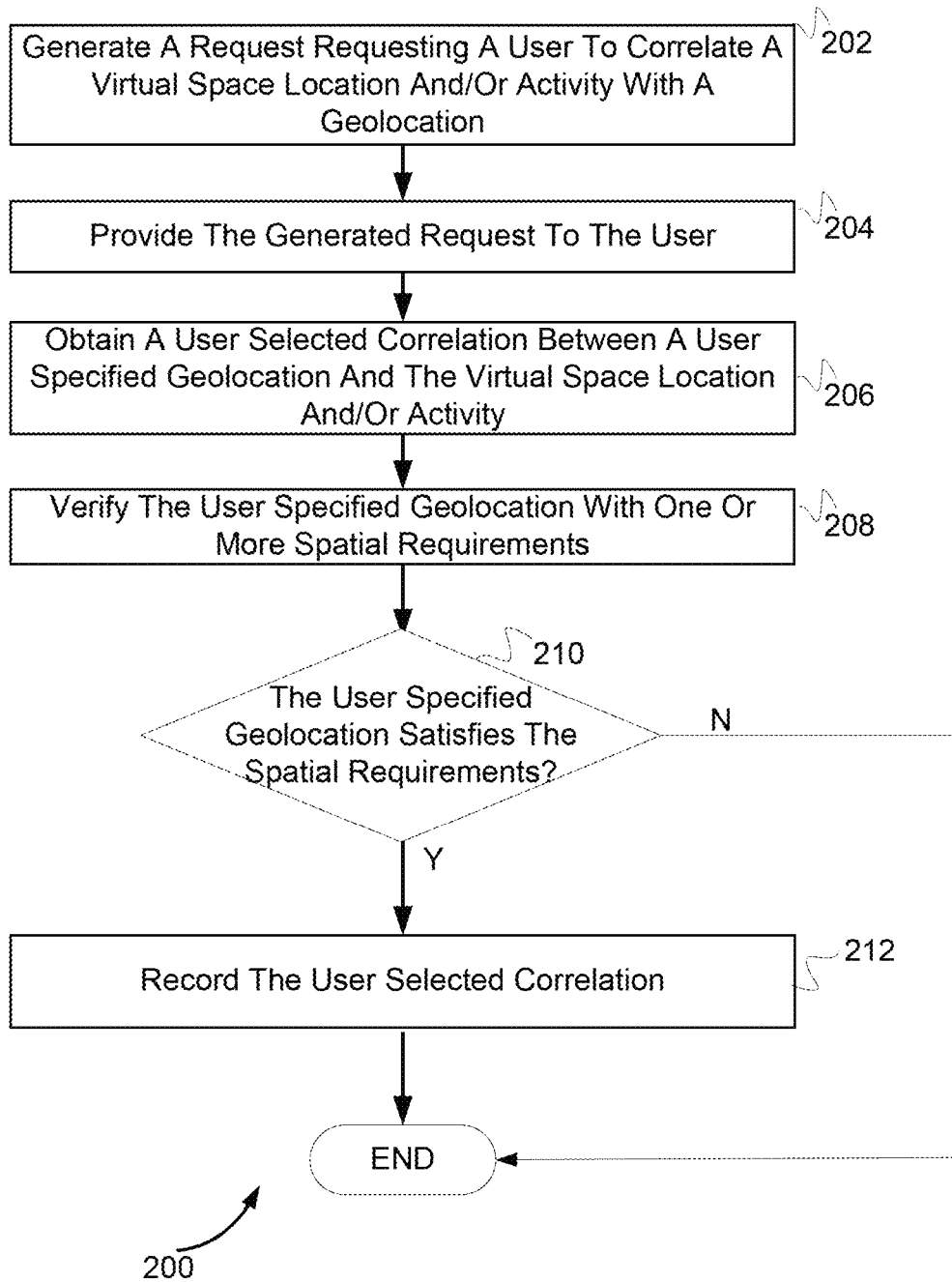
FIG. 2 illustrates one exemplary method of facilitating a user defined virtual space.
Figure 3:
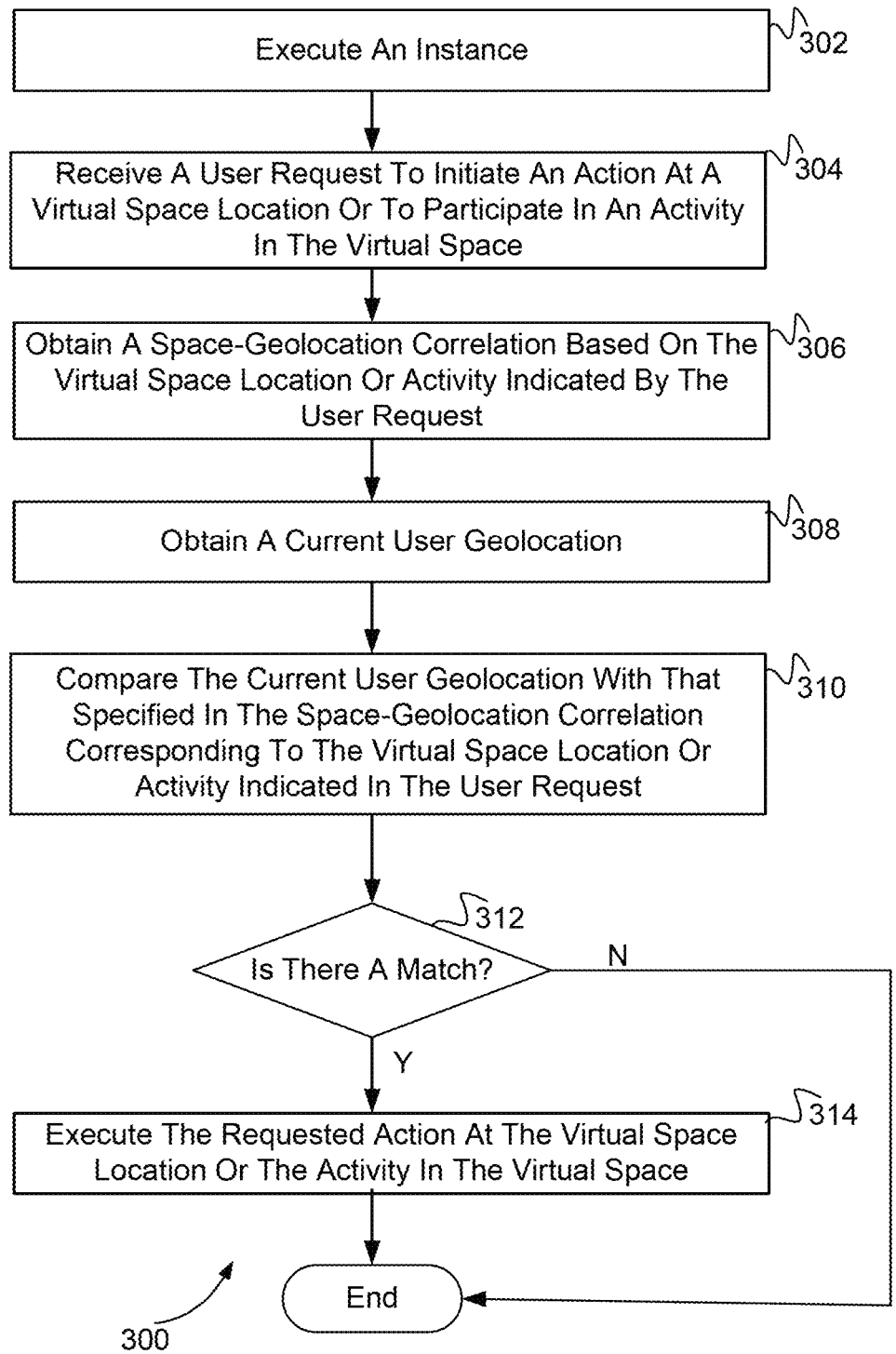
FIG. 3 illustrates another exemplary method of facilitating a user defined virtual space.

FIG. 2 illustrates one exemplary method of facilitating a user defined virtual space. The operations of method 200 presented below are intended to be illustrative. In some embodiments, method 200 may be accomplished with one or more additional operations not described, and/or without one or more of the operations discussed. Additionally, the order in which the operations of method 60 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a request requesting a user to correlate a virtual space location and/or a virtual space location with a geolocation may be generated. In some implementations, operation 202 may be performed by a space-geolocation request module the same as or similar to trigger module 112 (shown in FIG. 1 and described herein).

At an operation 204, the generated request may be provided to the user. For example, the request may be provided to the user via a user interface (e.g., graphical and/or command line). In some implementations, operation 204 may be performed by a space-geolocation request module the same as or similar to trigger module 112 (shown in FIG. 1 and described herein).

At an operation 206, a user selected correlation between a user specified geolocation and the virtual space location and/or the virtual space activity may be obtained. In some implementations, operation 204 may be performed by a space-geolocation correlation module the same as or similar to trigger module 110 (shown in FIG. 1 and described herein).

At an operation 208, the user specified geolocation may be verified with one or more spatial requirements. In some implementations, operation 208 may be performed by a space-geolocation correlation module the same as or similar to trigger module 110 (shown in FIG. 1 and described herein).

At an operation 210, a determination whether the user specified geolocation satisfies the spatial requirements may be made. In some implementations, operation 210 may be performed by a space-geolocation correlation module the same as or similar to trigger module 110 (shown in FIG. 1 and described herein).

In the even where operation 210 determines that the user specified geolocation does not satisfy the spatial requirements, the method 200 may proceed to the end as illustrated. In the event where operation 210 determines that the user specified geolocation satisfies the spatial requirement, the method 200 may proceed to operation 212.

At an operation 212, the user selected correlation between the user specified geolocation and the virtual space location and/or activity may be recorded. In some implementations, operation 212 may be performed by a space-geolocation correlation module the same as or similar to trigger module 110 (shown in FIG. 1 and described herein).

FIG. 2 illustrates another exemplary method of facilitating a user defined virtual space. The operations of method 300 presented below are intended to be illustrative. In some embodiments, method 300 may be accomplished with one or more additional operations not described, and/or without one or more of the operations discussed. Additionally, the order in which the operations of method 60 are illustrated in FIG. 2 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a virtual space may be executed and implemented to facilitate user participation in the virtual space. The users may participate in the virtual space by initiating a request to execute an action and/or activity in the virtual space. The user request to execute the action and/or activity may specify an action type and/or activity type. In some implementations, operation 302 may be performed by a space module the same as or similar to space module 106 (shown in FIG. 1 and described herein).

At an operation 304, a user request that initiates an action at virtual location or participate in virtual space activity is received. In some implementations, operation 302 may be performed by a space module the same as or similar to space module 106 (shown in FIG. 1 and described herein).

At an operation 306, a space-geolocation correlation based on the virtual space location or activity indicated by the user request, as received in operation 304, may be obtained. In some implementations, operation 306 may be performed by a user module the same as or similar to user module 108 (shown in FIG. 1 and described herein).

At an operation 308, a current geolocation of the user may be obtained. In some implementations, operation 308 may be performed by a user geolocation module the same as or similar to user geolocation module 108 (shown in FIG. 1 and described herein).

At an operation 310, the obtained current user geolocation may be compared with that specified in the space-geolocation correlation corresponding to the virtual space location activity indicated the user request. In some implementations, operation 310 may be performed by a space module the same as or similar to space module 106 (shown in FIG. 1 and described herein).

At an operation 312, a determination whether the current user geolocation matches the geolocation specified in the space-geolocation correlation obtained in the operation 306 may be made. In some implementations, operation 312 may be performed by a space module the same as or similar to space module 106 (shown in FIG. 1 and described herein).

In the event where it is determined that the current user geolocation does not match the geolocation specified in the correlation obtained in the operation 306, the method proceeds to an end, as shown. In the event, where such a match is found, the method 200 proceeds to operation 314.

At an operation 314, the requested action or activity may be executed. In some implementations, operation 314 may be performed by a space module the same as or similar to space module 106 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate user defined virtual space, the system comprising:

one or more processors configured by machine-readable instructions to:

execute an instance of a virtual space, and to implement the instance of the virtual space to facilitate user participation in the virtual space, wherein user participation in the virtual space is facilitated by receiving user requests to initiate actions at locations within the virtual space and executing corresponding actions in the instance, wherein an individual user request specifies an action type in a virtual space location;

manage user information associated with the individual users, the user information including user selected space-geolocation correlations between geolocations and virtual space locations such that the user accounts include first user information associated with the first user;

verify that a selection of a first space-geolocation correlation between a first virtual space location and a first geolocation satisfies one or more spatial requirements, wherein the spatial requirements include one or more requirements specified for the user that reflect geographic relationships between or among virtual space locations;

in response to verification that the first space-geolocation correlation satisfies the spatial requirements, record the first space-geolocation correlation in the first user information associated with the first user;

obtain geolocation information indicating current geolocations of the users; and wherein, responsive to receiving a request from the first user that specifies the first action type, and responsive to the current geolocation of the first user being the first geolocation, an action of the first action type is executed in the instance of the virtual space at the first virtual space location.

2. The system of claim 1, wherein the one or more processors are further configured by machine-readable instructions to enable users to correlate geolocations with virtual space locations such that the first space-geolocation correlation is recorded by the first user by specifying that the first geolocation corresponds to the first virtual space location.

3. The system of claim 2, wherein the one or more processors are further configured by machine-readable instructions such that the first space-geolocation correlation is recorded responsive to a determination that the first geolocation satisfies one or more spatial requirements.

4. The system of claim 3, wherein the spatial requirements comprises one or more of:
   a minimum distance between geolocations correlated with corresponding virtual space locations;
   a geometry pattern among geolocations correlated with corresponding virtual space locations;
   a position requirement specifying relative positions between or among geolocations based on the virtual space locations to correlated with the geolocations;
   a real world location type associated with a geolocation correlated with the corresponding virtual space location.

5. The system of claim 1, wherein the one or more processors are further configured by machine-readable instructions to generate requests requesting users to correlate geolocations with virtual space locations, the requests including a first request requesting the first user to correlate the first virtual space location with a geolocation.

6. The system of claim 5, wherein the one or more processors are further configured by machine-readable instructions to specify in the first request one or more spatial requirements to be satisfied by the first geolocation.

7. The system of claim 1, wherein the first user action type is defending, attacking, mining, logging, farming, managing, surveying, training, researching, constructing, or recruiting.

8. The system of claim 1, wherein the individual user request further specifies an activity type in the virtual space and the user information further include user selected space-geolocation correlations between geolocations and activity types in the virtual space such that the user information include first user information associated with the first user that includes a second correlation between a first activity type and a second geolocation, and wherein the one or more processors are further configured by machine-readable instructions such that responsive to receiving a request from the first user that specifies the first activity type, and responsive to the current geolocation of the first user being the second geolocation, an activity of the first activity type is executed in the instance of the virtual space.

9. The system of claim 8, wherein the first activity type is buying virtual items, selling virtual items, completing a quest, participating in a tournament, performing diplomacy, consulting with a virtual space expert, forming an alliance, conducting an alliance meeting or messaging one or more other users in the virtual space.

10. A computer-implemented method of facilitating user defined virtual space, the method being implemented in one or more physical processors configured by machine-readable instructions, the method comprising:
   executing an instance of a virtual space;
   implementing the instance of the virtual space to facilitate user participation in the virtual space, wherein the user participation in the virtual space is facilitated by receiving user requests to initiate actions at locations within the virtual space and executing corresponding actions in the instance, wherein an individual user request specifies an action type in a virtual space location;
   managing user information associated with the individual users, the user information including user specified space-geolocation correlations between geolocations and virtual space locations such that the user information include a first user information associated with the first user;
   verifying that a selection of a first space-geolocation correlation between a first virtual space location and a first geolocation satisfies one or more spatial requirements, wherein the spatial requirements include one or more requirements specified for the user that reflect geographic relationships between or among virtual space locations;
   in response to verification that the first space-geolocation correlation satisfies the spatial requirements, recording the first space-geolocation correlation in the first user information associated with the first user;
   obtaining geolocation information indicating current geolocations of the users; and
   responsive to receiving a request from the first user that specifies the first action type, and responsive to the current geolocation of the first user being the first geolocation, executing an action of the first action type in the instance of the virtual space at the first virtual space location.

11. The method of claim 10, wherein the method further comprises enabling users to correlate geolocations with virtual space locations such that the first space-geolocation correlation is recorded by the first user by specifying that the first geolocation corresponds to the first virtual space location.

12. The method of claim 11, wherein the method further comprises responsive to a determination that the first geolocation satisfies one or more spatial requirements, recording the first space-geolocation correlation.

13. The system of claim 12, wherein the spatial requirements comprises one or more of:
   a minimum distance between geolocations correlated with corresponding virtual space locations;
   a geometry pattern among geolocations correlated with corresponding virtual space locations;
   a position requirement specifying relative positions between or among geolocations based on the virtual space locations to correlated with the geolocations;
   a real world location type associated with a geolocation correlated with the corresponding virtual space location.

14. The system of claim 10, wherein the method further comprises generating requests requesting users to correlate geolocations with virtual space locations, the requests including a first request requesting the first user to correlate the first virtual space location with a geolocation.

15. The system of claim 14, wherein the method further comprises specifying in the first request one or more spatial requirements to be satisfied by the first geolocation.

16. The system of claim 10, wherein the first user action type is defending, attacking, mining, logging, farming, managing, surveying, training, researching, constructing, or recruiting.

17. The system of claim 10, wherein the individual user request further specifies an activity type in the virtual space and the user information further include user selected space-geolocation correlations between geolocations and activity types in the virtual space such that the user information include a first user information associated with the first user that includes a second space-geolocation correlation between a first activity type and a second geolocation, and responsive to receiving a request from the first user that specifies the first activity type, and responsive to the current geolocation of the first user being the second geolocation, executing an activity of the first activity type in the instance of the virtual space.

18. The system of claim 17, wherein the first activity type is buying virtual items, selling virtual items, completing a quest, participating in a tournament, performing diplomacy, consulting with a virtual space expert, forming an alliance, conducting an alliance meeting or messaging one or more other users in the virtual space.

\* \* \* \* \*